(12) United States Patent
Liu et al.

(10) Patent No.: US 11,416,289 B2
(45) Date of Patent: Aug. 16, 2022

(54) TASK SCHEDULING METHOD, ELECTRONIC DEVICE, AND COMPUTER STORAGE MEDIUM

(71) Applicant: EMC IP Holding Company LLC, Hopkinton, MA (US)

(72) Inventors: Jinpeng Liu, Shanghai (CN); Jin Li, Shanghai (CN); Pengfei Wu, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 16/823,445

(22) Filed: Mar. 19, 2020

(65) Prior Publication Data
US 2021/0240525 A1  Aug. 5, 2021

(30) Foreign Application Priority Data

Jan. 31, 2020  (CN) .......................... 202010077759.5

(51) Int. Cl.
*G06F 9/48*   (2006.01)
*G06F 9/50*   (2006.01)
(Continued)

(52) U.S. Cl.
CPC .............. *G06F 9/4881* (2013.01); *G06F 9/48* (2013.01); *G06F 9/485* (2013.01); *G06F 9/4806* (2013.01);
(Continued)

(58) Field of Classification Search
CPC ........ G06F 9/48; G06F 9/4806; G06F 9/4843; G06F 9/485; G06F 9/4881; G06F 9/50;
(Continued)

(56) References Cited

U.S. PATENT DOCUMENTS

| | | | | |
|---|---|---|---|---|
| 6,467,002 B1 * | 10/2002 | Yang | ..................... | G06F 13/362 |
| | | | | 710/116 |
| 2010/0333109 A1 * | 12/2010 | Milnor | .................. | G06F 9/4881 |
| | | | | 718/106 |

(Continued)

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.
(Continued)

*Primary Examiner* — Charles M Swift
(74) *Attorney, Agent, or Firm* — Ryan, Mason & Lewis, LLP (57) ABSTRACT

A method includes: if it is determined that a currently available resource of a task processing system cannot satisfy a resource requirement of a to-be-executed current task set of a plurality of task sets, scheduling, for execution, one or more tasks in the current task set that can be supported by the currently available resource; creating, based on one or more tasks that have not been scheduled in the current task set, a to-be-scheduled task set for a next round of scheduling; determining, in a next task set of the plurality of task sets that follows the current task set, a subset of tasks that are independent of the one or more tasks in the to-be-scheduled task set, where the next task set is dependent at least in part on the current task set; and moving the subset from the next task set into the to-be-scheduled task set.

20 Claims, 6 Drawing Sheets

(51) Int. Cl.
  *G06F 9/52*  (2006.01)
  *G06F 3/08*  (2006.01)
  *G06N 3/08*  (2006.01)

(52) U.S. Cl.
  CPC .............. *G06F 9/4843* (2013.01); *G06F 9/50* (2013.01); *G06F 9/5005* (2013.01); *G06F 9/5027* (2013.01); *G06F 9/52* (2013.01); *G06N 3/08* (2013.01)

(58) Field of Classification Search
  CPC ........ G06F 9/5005; G06F 9/5027; G06F 9/52; G06N 3/08; G06N 5/00; G06N 20/00
  See application file for complete search history.

(56) References Cited

U.S. PATENT DOCUMENTS

| | | | | |
|---|---|---|---|---|
| 2012/0159496 | A1* | 6/2012 | Dighe | G06F 1/3206 718/102 |
| 2017/0090979 | A1* | 3/2017 | Dinan | G06F 9/4881 |
| 2018/0088989 | A1* | 3/2018 | Nield | G06F 9/4893 |
| 2018/0300653 | A1* | 10/2018 | Srinivasan | H04L 67/06 |
| 2018/0336062 | A1* | 11/2018 | Kolachala | G06F 9/4881 |
| 2019/0324810 | A1 | 10/2019 | Zhao et al. | |
| 2019/0340010 | A1* | 11/2019 | Lee | G06N 7/08 |
| 2020/0019445 | A1* | 1/2020 | Altintas | G06F 9/5011 |
| 2020/0319867 | A1* | 10/2020 | Ballard | G06F 8/24 |

OTHER PUBLICATIONS

Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901.02067v1, Jan. 7, 2019, 13 pages.
U.S. Appl. No. 16/540,385 filed in the name of Jinpeng Liu et al. Aug. 14, 2019, and entitled "Method, a Device and a Computer Program Product for Determining a Resource Required for Executing a Code Segment."
U.S. Appl. No. 16/542,757 filed in the name of Jinpeng Liu et al. Aug. 16, 2019, and entitled "Method, Device and Computer Program Product for Processing Machine Learning Model."
U.S. Appl. No. 16/678,758 filed in the name of Jinpeng Liu et al. Nov. 8, 2019, and entitled "Method, Electronic Device and Computer Program Product for Processing Machine Learning Model."
U.S. Appl. No. 16/789,006 filed in the name of Jin Li et al. Feb. 12, 2020, and entitled "Scheduling Artificial Intelligence Model Partitions Based on Reversed Computation Graph."

* cited by examiner

TASK SCHEDULING METHOD, ELECTRONIC DEVICE, AND COMPUTER STORAGE MEDIUM

RELATED APPLICATION(S)

The present application claims priority to Chinese Patent Application No. 202010077759.5, filed Jan. 31, 2020, and entitled "Task Scheduling Method, Electronic Device, and Computer Storage Medium," which is incorporated by reference herein in its entirety.

FIELD

Embodiments of the present disclosure relate in general to the field of information processing, and in particular to a task scheduling method, an electronic device, and a computer storage medium.

BACKGROUND

Currently, there are many popular deep learning frameworks, but no matter whether it is data parallelism or model parallelism, none of these frameworks are able to schedule deep learning tasks, for example, epoch and model partitioning, based on resources. If these frameworks are used in a cloud, a user first has to create a virtual machine, and specify how many computing resources are required without knowing whether computing capacity of these resources is excessive or insufficient for these types of deep learning tasks.

SUMMARY

Embodiments of the present disclosure provide a task scheduling method, an electronic device, and a computer storage medium to allow scheduling of parallel tasks in a manner that correctly maintains a dependency between tasks, and ensures maximum utilization of a currently available resource, thereby avoiding a waste of resources.

In a first aspect of the present disclosure, a task scheduling method is provided. The method includes: if it is determined that a currently available resource of a task processing system cannot satisfy a resource requirement of a to-be-executed current task set of a plurality of task sets, scheduling, for execution, one or more tasks in the current task set that can be supported by the currently available resource, where tasks in each task set are independent of each other; creating, based on one or more tasks that have not been scheduled in the current task set, a to-be-scheduled task set for a next round of scheduling; determining, in a next task set of the plurality of task sets that follows the current task set, a subset of tasks that are independent of the one or more tasks in the to-be-scheduled task set, where the next task set is dependent at least in part on the current task set; and moving the subset from the next task set into the to-be-scheduled task set.

In a second aspect of the present disclosure, an electronic device is provided. The device includes at least one processing unit and at least one memory. The at least one memory is coupled to the at least one processing unit and stores instructions to be executed by the at least one processing unit. When the instruction is executed by the at least one processing unit, the device is caused to execute actions, where the actions include: if it is determined that a currently available resource of a task processing system cannot satisfy a resource requirement of a to-be-executed current task set of a plurality of task sets, scheduling, for execution, a task that is in the current task set and that can be supported by the currently available resource, where tasks in each task set are independent of each other; creating, based on one or more tasks that have not been scheduled in the current task set, a to-be-scheduled task set for a next round of scheduling; determining, in a next task set of the plurality of task sets that follows the current task set, a subset of tasks that are independent of the one or more tasks in the to-be-scheduled task set, where the next task set is dependent at least in part on the current task set; and moving the subset from the next task set into the to-be-scheduled task set.

In a third aspect of the present disclosure, a computer-readable storage medium is provided. The computer-readable storage medium stores a computer program, and when the computer program is executed by a machine, the machine is caused to implement any step of the method described in the first aspect of the present disclosure.

The summary is provided to introduce the selection of concepts in a simplified form, which are further described in the detailed description below. The summary is not intended to identify each and every key feature or essential feature of the present disclosure, nor is it intended to limit the scope of the present disclosure.

BRIEF DESCRIPTION OF THE DRAWINGS

By describing example embodiments of the present disclosure in more detail with reference to the accompanying drawings, the foregoing and other objectives, features, and advantages of the present disclosure become more apparent. In the example embodiments of the present disclosure, like reference numerals indicate like elements.

Like or corresponding reference numerals in the accompanying drawings indicate like or corresponding elements.

DETAILED DESCRIPTION

Illustrative embodiments of the present disclosure will be described in more detail with reference to the accompanying drawings. Although the illustrative embodiments of the present disclosure are shown in the accompanying drawings, it should be understood that the present disclosure may be implemented in various forms and should not be limited by the embodiments set forth herein. Instead, these embodiments are provided to make the present disclosure more thorough and complete, and fully convey the scope of the present disclosure to those skilled in the art.

The term "comprise" and its variants used herein are inclusive, meaning "including but not limited to." Unless otherwise specified, the term "or" means "and/or." The term "based on" means "based at least in part on." The terms "an example embodiment" and "an embodiment" mean "at least one example embodiment." The term "another embodiment" means "at least one other embodiment." The terms "first," "second," and the like may refer to different objects or the same object. Below may also include other explicit and implicit definitions.

It is found through research that the prior art fails to provide the following solution: scheduling parallel tasks of a neural network model based on a resource requirement of the parallel tasks of the neural network model and available resources in one or more dedicated processing resources, so that one or more dedicated processing resources can be scheduled for execution of the parallel tasks of the neural network model. To implement this solution, the following problems need to be addressed.

Problem 1: Dividing the neural network model into a plurality of tasks that can be executed in parallel.

Problem 2: How many computing resources are needed for each task?

For problem 1, a computation graph may be generated by compiling a neural network model, and the computation graph may be divided into a plurality of task sets, such as a list of a plurality of task sets. All tasks in the same task set are independent of each other, and therefore they can be scheduled and executed in parallel. A task set of the plurality of task sets is dependent at least in part on its previous task set, so the plurality of task sets are scheduled one by one, that is, tasks in task set S are scheduled after all tasks in all task sets before task set S of the plurality of task sets have been scheduled.

For problem 2, the resource requirement of the parallel tasks of the neural network model may be obtained by virtually compiling the computation graph.

However, whether all tasks in an independent task set can actually be scheduled for execution is still dependent on the available resources. For example, tasks A, B, C, and D in a current set can be executed in parallel, but if only tasks A, B, and D can be scheduled for execution due to a computing resource constraint, remaining task C will have to be scheduled in a next round of scheduling. However, in the next round of scheduling, task C cannot be simply placed into a next set {E, F} for scheduling tasks C, E, and F together, since task F is dependent on task C. If only task C is scheduled in the next stage, computing resources will be wasted since task C could be otherwise scheduled to be executed in parallel with task E.

To resolve at least one or more of the above problems and other potential problems, an example embodiment of the present disclosure proposes a task scheduling solution. In this solution, if it is determined that currently available resources of a task processing system are unable to satisfy a resource requirement of a to-be-executed current task set of a plurality of task sets, a task that is in the current task set and that can be supported by the currently available resources is scheduled for execution, where tasks in each task set are independent of each other; a to-be-scheduled task set for a next round of scheduling is created based on one or more tasks that have not been scheduled in the current task set; a subset of tasks that are independent of the one or more tasks in the to-be-scheduled task set is determined in a next task set of the plurality of task sets that follows the current task set, where the next task set is dependent at least in part on the current task set; and the subset is moved from the next task set into the to-be-scheduled task set.

In this way, the to-be-scheduled task set for the next round of scheduling includes the unscheduled task(s) in the current round and task(s) in the next set which are independent of the unscheduled task(s), rather than just the unscheduled task(s) in the current round, so that parallel tasks can be scheduled in a manner that correctly maintains a dependency between tasks, and maximum utilization of the currently available resource can be ensured, thereby avoiding waste of resources.

The following further details specific examples of this solution with reference to the drawings.

Figure 1:
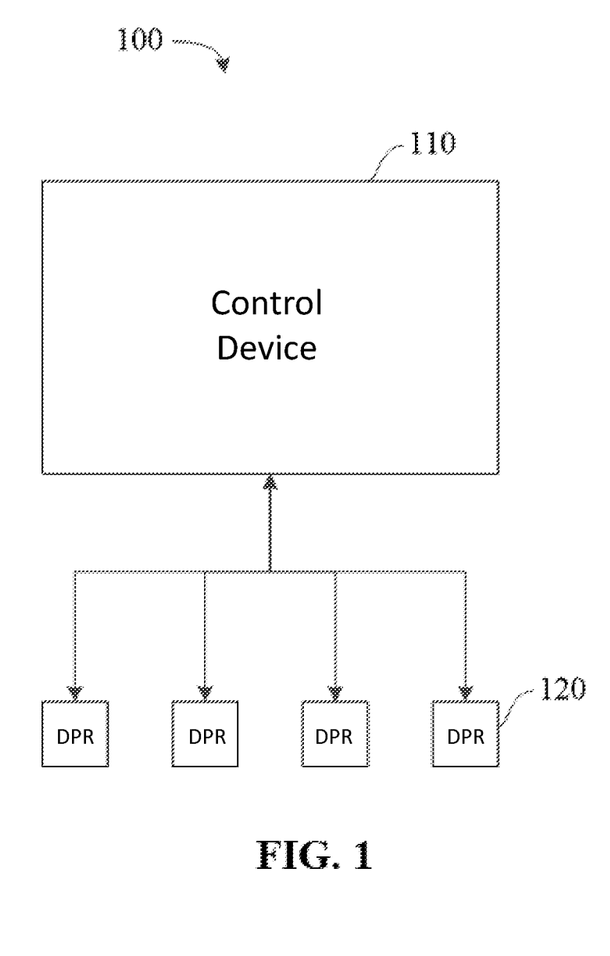
FIG. 1 is a schematic diagram of an example of information processing environment according to an embodiment of the present disclosure.

FIG. 1 is a schematic diagram of an example of information processing environment 100 according to an embodiment of the present disclosure. Information processing environment 100 includes control device 110 and one or more dedicated processing resources 120. The one or more dedicated processing resources (abbreviated in figure as DPR) 120 may constitute a task processing system.

Control device 110 is but is not limited to, for example, a central processing unit (CPU). Dedicated processing resource 120 is but is not limited to, for example, a graphics processing unit (GPU). Control device 110 and one or more dedicated processing resources 120 may be located on the same node, for example, a server. Control device 110 may be coupled to one or more dedicated processing resources 120, for example, via a bus.

Control device 110 is configured to obtain a to-be-executed current task set in a task set list, a resource requirement of the current task set, and a currently available resource such as a currently available resource in one or more dedicated processing resources 120, for example, a memory resource and/or thread resource on the GPU.

Control device 110 is further configured to: if it is determined that the currently available resource cannot satisfy the resource requirement of the to-be-executed current task set in the task set list, schedule, for execution, a task that is in the current task set and that can be supported by the currently available resource; create, based on one or more tasks that have not been scheduled in the current task set, a to-be-scheduled task set for a next round of scheduling; and move, into the to-be-scheduled task set, a subset of tasks that are independent of the one or more tasks in the to-be-scheduled task set and that are in a next task set following the current task set in the list.

One or more dedicated processing resources 120 are configured to execute a scheduled task.

The task scheduling method of the present disclosure will be described below with reference to FIGS. 1 and 2.

Figure 2:
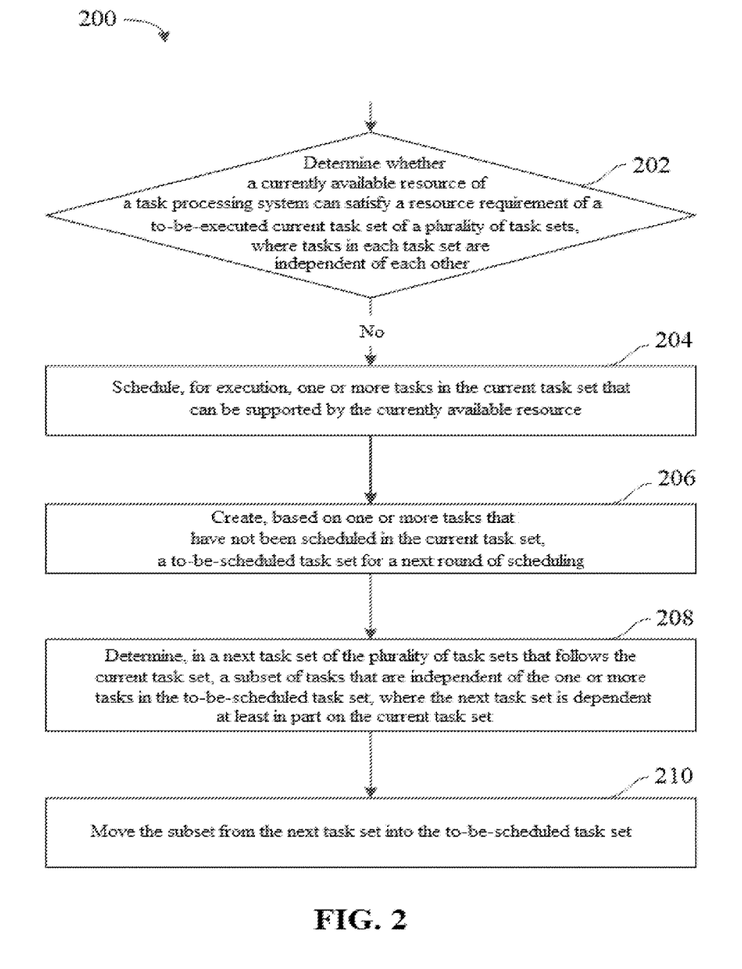
FIG. 2 is a schematic flowchart of an example of task scheduling method according to an embodiment of the present disclosure.

FIG. 2 is a schematic flowchart of an example of task scheduling method 200 according to an embodiment of the present disclosure. For example, method 200 may be executed by control device 110 in FIG. 1. It should be understood that method 200 may further include additional boxes not illustrated and/or omit an illustrated box. The scope of the present disclosure is not limited in this sense.

At block 202, it is determined at control device 110 whether a currently available resource of a task processing system can satisfy a resource requirement of a to-be-executed current task set of a plurality of task sets, where tasks in each task set are independent of each other.

In some embodiments, each task set may include parallel tasks of a neural network model, for example, parallel partitions or kernel functions of the neural network model. The neural network model may include, for example, a deep neural network model.

In some embodiments, the plurality of task sets may be generated based on a computation graph, and the computation graph is generated by compiling the neural network model. In some embodiments, the plurality of task sets may constitute a list. This will be described in detail below with reference to FIGS. 3 and 4.

In some embodiments, a resource required for executing the parallel tasks may be obtained by virtually compiling the computation graph. This will be described in detail below with reference to FIG. 5.

In some embodiments, method 200 may further include: determining the currently available resource based on at least one of a computing resource and a storage resource that are currently available to the task processing system.

In some embodiments, the task processing system may include one or more dedicated processing resources 120, for example, one or more GPUs. The computing resource may include a thread resource, for example, a thread resource on the one or more GPUs. The storage resource may include a memory resource, for example, a memory resource on the one or more GPUs.

In some embodiments, method 200 may further include: determining, based on a resource required for executing tasks in the current task set, whether the currently available resource can satisfy the resource requirement of the current task set. For example, whether the currently available resource is more than the resource required for execution of all the tasks in the current task set may be determined to determine whether the currently available resource can satisfy the resource requirement of the current task set.

If it is determined at block 202 that the currently available resource of the task processing system cannot satisfy the resource requirement of the to-be-executed current task set of the plurality of task sets, at block 204, one or more tasks in the current task set that can be supported by the currently available resource are scheduled for execution.

Scheduling, for execution, the tasks in the current task set that can be supported by the currently available resource may be, for example, scheduling, for execution, a maximum number of tasks in the current task set that can be supported by the currently available resource.

In some embodiments, a plurality of tasks may be scheduled for execution on one dedicated processing resource 120. For example, the plurality of tasks are scheduled for execution on one GPU. Alternatively or additionally, in some embodiments, a plurality of tasks may be scheduled for execution on a plurality of dedicated processing resources 120. For example, a plurality of tasks are scheduled for execution on a plurality of GPUs.

At block 206, a to-be-scheduled task set for a next round of scheduling is created based on one or more tasks that have not be scheduled in the current task set. The created to-be-scheduled task set may include, for example, the one or more tasks that have not be scheduled in the current task set.

At block 208, a subset of tasks that are independent of the one or more tasks in the to-be-scheduled task set are determined in a next task set of the plurality of task sets that follows the current task set, where the next task set is dependent at least in part on the current task set.

The next task set being dependent at least in part on the current task set may be, for example, at least some of tasks in the next task set being dependent on at least some of tasks in the current task set. For example, input of task A (for example, kernel function A) in the next task set is dependent on output of task B (for example, kernel function B) in the current task set.

At block 210, the subset is moved from the next task set into the to-be-scheduled task set.

In some embodiments, that the subset is moved from the next task set into the to-be-scheduled task set may be: adding the subset to the to-be-scheduled task set and deleting the subset from the next task set.

In this way, the to-be-scheduled task set for the next round of scheduling includes one or more tasks that have not be scheduled in the current round and task(s) in the next set which are independent of the unscheduled tasks, rather than just the one or more tasks that have not been scheduled in the current round, so that parallel tasks can be scheduled in a manner that correctly maintains a dependency between tasks, and maximum utilization of the currently available resource can be ensured, thereby avoiding waste of resources. In addition, a solution is also provided in which parallel tasks of a neural network model are scheduled based on a resource requirement of a current task set and a currently available resource for the current task set that includes the parallel tasks of the neural network model. This solution can also achieve the foregoing technical effects.

An example of generating a plurality of task sets based on a computation graph will be described below with reference to FIGS. 3 and 4.

Figure 3:
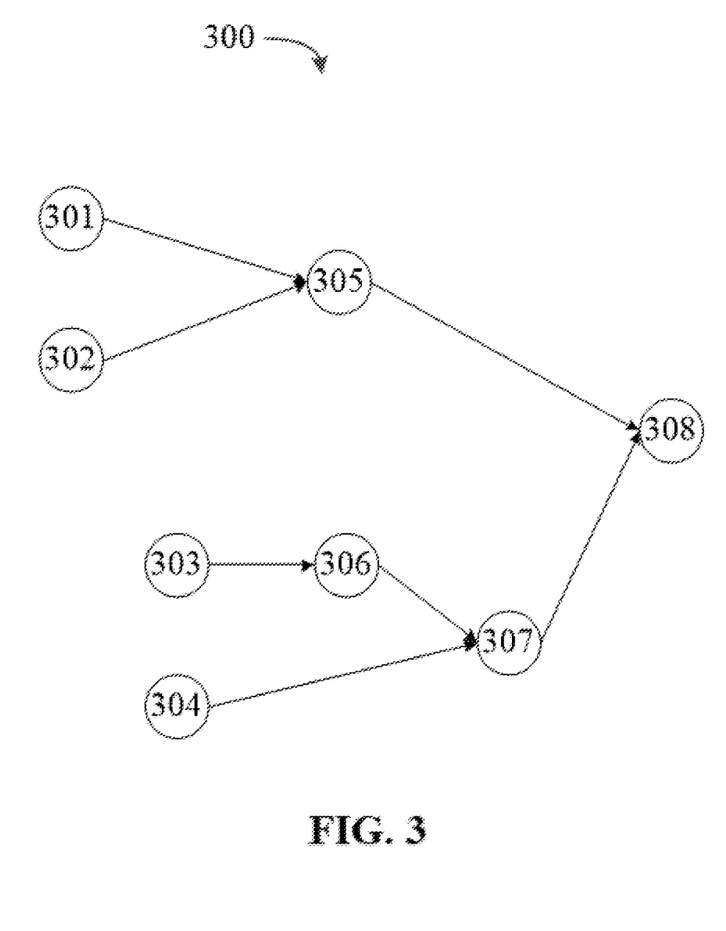
FIG. 3 is a schematic diagram of computation graph according to an embodiment of the present disclosure.

FIG. 3 is a schematic diagram of an example of computation graph 300 according to an embodiment of the present disclosure. For example, the computation graph may be obtained by compiling code of a neural network model into an intermediate representation, and parsing the intermediate representation.

As shown in FIG. 3, computation graph 300 may be, for example, a directed acyclic graph DAG that includes a plurality of nodes and edges. A node represents a task executed by the neural network model, for example, a kernel function. An edge between nodes represents a dependency between tasks. As shown in FIG. 3, nodes 301, 302, 303, and 304 are independent of each other, node 305 is dependent on nodes 301 and 302, node 306 is dependent on node 303, node 307 is dependent on nodes 304 and 306, and node 308 is dependent on nodes 305 and 307.

A plurality of task sets, for example, a list including a plurality of task sets, may be generated from a computation graph in the following steps.

Step 1: Traverse the entire computation graph to find all nodes that are independent of each other, and place them into a task set. Apparently, all nodes in the same task set are independent of each other, and therefore this task set is referred to as an independent set.

Step 2: Delete all the found nodes and edges of these nodes from the computation graph, so that the original computation graph is degraded into a new computation graph, where the new computation graph is a subgraph of the original computation graph.

Step 3: Place the resulting task set after the previous task set, for example, after the previous task in the list.

Step 4: Use the new computation graph as a target computation graph and return to step 1.

In the first round of traversal, mutually independent nodes 301, 302, 303, and 304 in the computation graph 300 constitute task set 410 (FIG. 4), so a task set resulting from the first round of traversal includes task set 410. Now, computation graph 300 has been degraded to one including nodes 305, 306, 307, and 308.

In the second round of traversal, mutually independent nodes 305 and 306 constitute task set 420 (FIG. 4), so task sets resulting from the second round of traversal include task set 410 and task set 420. Now, computation graph 300 has been degraded to one including nodes 307 and 308.

In the third round of traversal, node 307 constitutes task set 430 (FIG. 4), so task sets resulting from the third round of traversal include task set 410, task set 420, and task set 430. Now, computation graph 300 has been degraded to one including node 308.

In the fourth round of traversal, node 308 constitutes task set 440 (FIG. 4), so task sets resulting from the fourth round of traversal include task set 410, task set 420, task set 430, and task set 440. Task set 410, task set 420, task set 430, and task set 440 may constitute, for example, a list.

Figure 4:
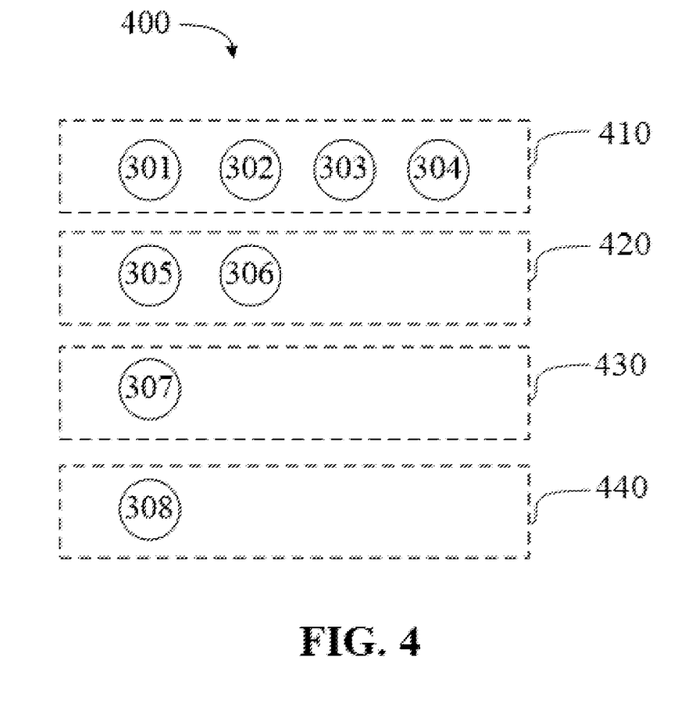
FIG. 4 is a schematic flowchart of a plurality of task sets according to an embodiment of the present disclosure.

The final resulting plurality of task sets 400 are shown in FIG. 4. Tasks in the same task set are independent of each other, and a task set of the plurality of task sets 400 is dependent at least in part on its preceding task set. For example, nodes or tasks 305 and 306 in task set 420 can be independently executed, but they must wait until tasks 301, 302, 303, and 304 in task set 410 are completed, because task 305 is dependent on tasks 301 and 302, and task 306 is dependent on tasks 303 and 304. For another example, task 307 in task set 430 is dependent on task 306 in task set 420, but is not dependent on task 305.

The following describes an example of obtaining, by virtually compiling a computation graph, a resource required for executing parallel tasks of a neural network model.

A compiler for the neural network model may generate two parts of code based on the computation graph: host code and device code.

The host code is for control device 110, and may be compiled into object code of the control device, for example, compiled into CPU executable code, without being limited thereto. The host code is used to schedule a task running on a dedicated processing resource, for example, a kernel function running on a GPU.

The device code is for dedicated processing resource 120, and is compiled into object code of the dedicated processing resource, for example, a library of the GPU, waiting for a call from the host code.

In a process of generating the host code, the compiler generates host code that allocates or releases a memory in a dedicated processing resource such as a GPU. In a process of generating the device code, the compiler calls an API linked to a vendor-specific compilation library or a vendor-specific kernel function implementation library. In either case, a function call for a resource calculation API may be added to the compilation library or kernel function implementation library, to obtain a memory required for executing a called kernel function.

Based on the foregoing principles, a virtual compiler may be created, and compilation behaviors of the virtual compiler during code generation may be modified.

In some embodiments, the virtual compilation method may include: if it is determined that to-be-generated code involves calling a kernel function, adding a resource calculation API to the code.

In some embodiments, the adding a resource calculation API to the code may include: determining whether the called kernel function is implemented in a library, and if it is determined that the kernel function is implemented in a library, replacing the called kernel function with the resource calculation API that comes from the same library, to obtain a resource required for executing the called kernel function.

Alternatively or additionally, in some embodiments, adding a resource calculation API to the code may include: determining whether the called kernel function is implemented by compiling previously generated kernel source code running on a dedicated processing resource; and if so, adding an additional compilation API, to obtain a resource required for executing the called kernel function.

In addition to or as a supplement to calling a kernel function, in some embodiments, the virtual compilation method may further include: if it is determined that to-be-generated code involves allocating a memory in a dedicated processing resource, increasing a memory resource required for executing a kernel function corresponding to the code by an allocated memory size.

For a thread resource requirement, the virtual compilation method may include: intercepting calling of a kernel function start API to obtain a thread resource required for executing a kernel function. For example, by intercepting calling of a NVIDIA driver API cuLaunchKernel function, a number of blocks in a grid for the launched kernel function and a number of threads in each block may be collected, so as to obtain, based on such information, a thread resource required for executing the kernel function. For example, a number of thread resources required for executing the kernel function is obtained by multiplying the number of blocks in the network by the number of threads in each block.

In some embodiments, the virtual compilation method may further include: deleting to-be-generated code if it is determined that the to-be-generated code involves initializing or releasing a dedicated processing resource, or involves copying data between the control device and a dedicated processing resource.

In this way, a dynamic resource required for executing the kernel function of the neural network model can be collected, even if a framework is implemented using a third-party kernel function. In addition, because a dedicated processing resource-related operation is removed from the virtual compiler, the compilation process is dependent only on CUDA software. Therefore, the neural network model can be compiled on a client without need for providing any dedicated processing resource, for example, a GPU. In addition, because actual kernel operations and data movement are removed from the virtual compiler, a compilation process of the computation graph can be brief.

An example of a task scheduling method is described below with reference to FIG. 5.

Figure 5:
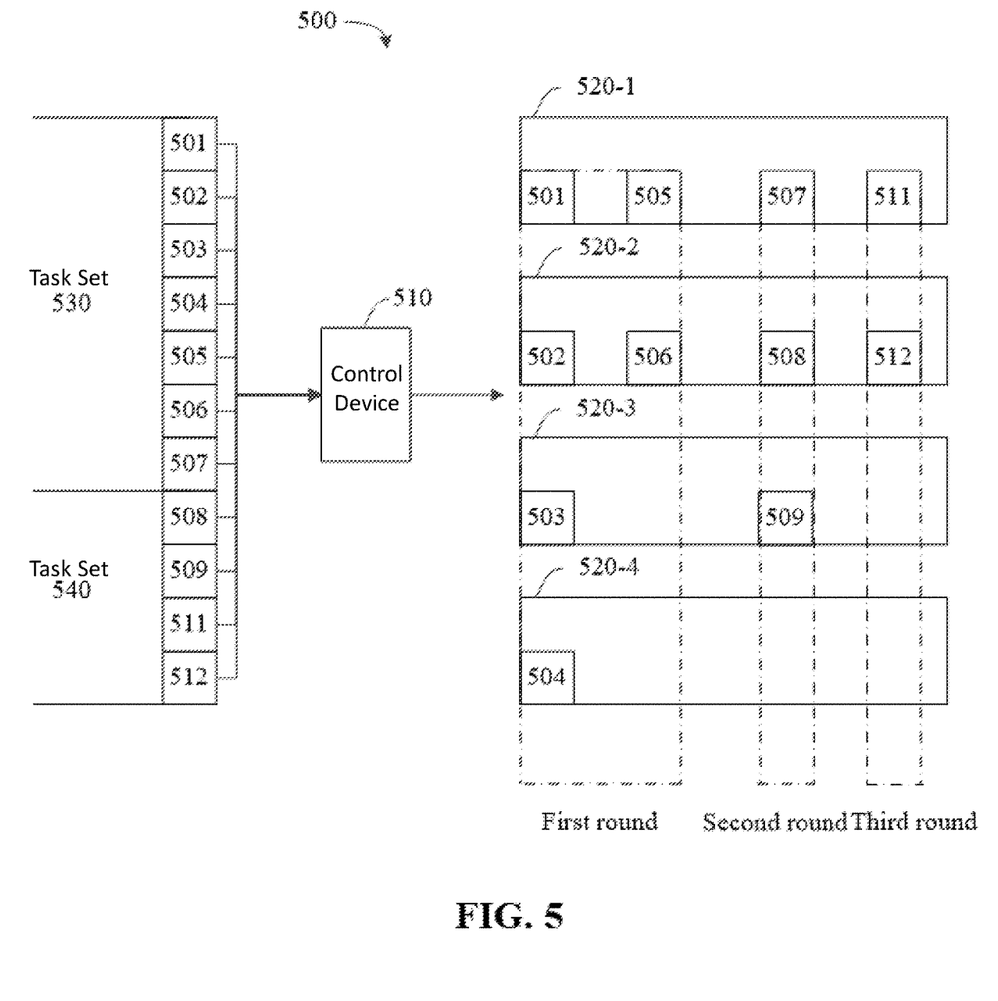
FIG. 5 is a schematic diagram of an example of scheduling result according to an embodiment of the present disclosure.

FIG. 5 is a schematic diagram of an example of scheduling result 500 according to an embodiment of the present disclosure. FIG. 5 shows control device 510 and four dedicated processing resources 520-1 to 520-4. In addition, FIG. 5 also shows two task sets: current set 530 that has seven tasks {501, 502, 503, 504, 505, 506, 507}, and next set 540 that has four tasks {508, 509, 511, 512}.

During scheduling of the control device 510, {501, 502, 503, 504, 505, 506} are scheduled for execution, for example, on dedicated processing resources 520-1 to 520-4. A plurality of tasks may be executed on one dedicated processing resource. For example, tasks 501 and 505 are executed on dedicated processing resource 520-1, and tasks 502 and 506 are executed on dedicated processing resource 520-2. Remaining task {507} will be left for a to-be-scheduled task set for a next round of scheduling.

Then, tasks {508, 509} in the next set are found independent of each task in {507}. Therefore, sets {507} and {508, 509} are combined into to-be-scheduled task set {507, 508, 509} for the next round of scheduling. The second round of scheduling is executed on to-be-scheduled task set {507, 508, 509}. In the second round, although dedicated processing resource 520-4 is available, tasks 511 and 512 cannot be scheduled because tasks 511 and 512 are dependent on 507.

The subsequent third round of scheduling is executed on remaining tasks {511, 512} in the next set.

Figure 6:
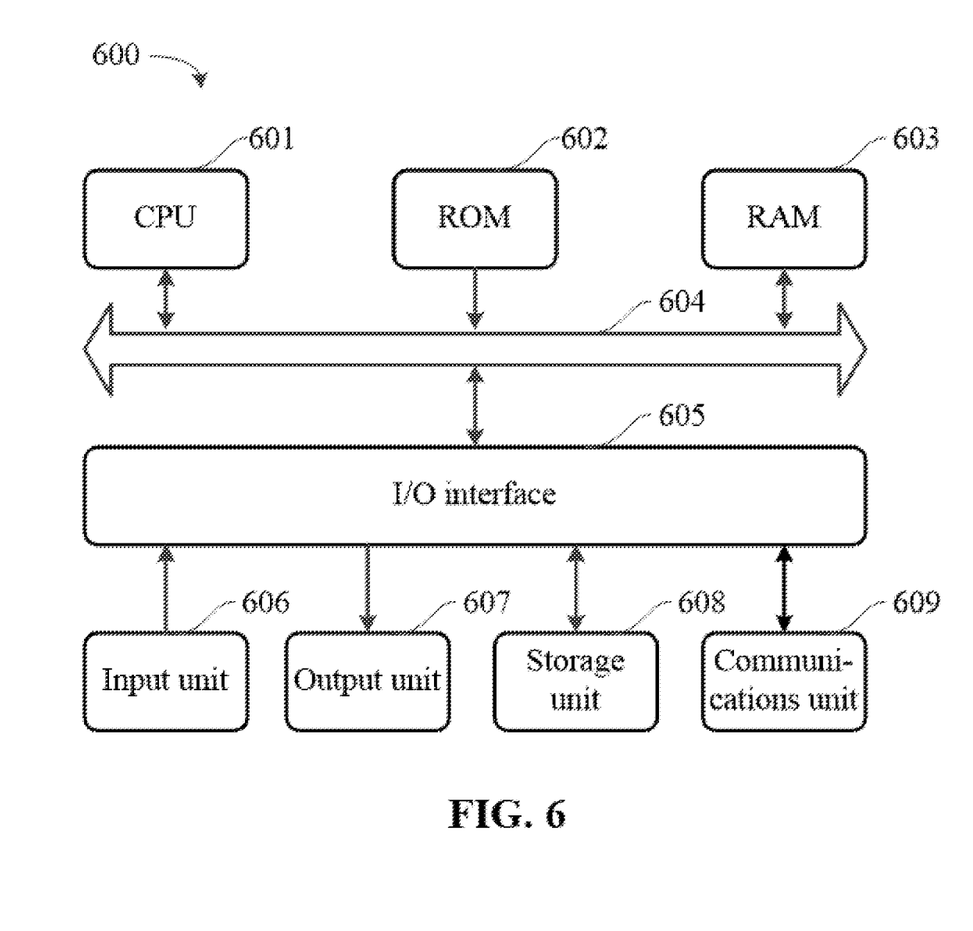
FIG. 6 is a schematic block diagram of an example of device that may be configured to implement an embodiment of the present disclosure.

FIG. 6 is a schematic block diagram of an example of device 600 that may be configured to implement an embodiment of the present disclosure. For example, control device 110 in FIG. 1 may be implemented by device 600. As shown in the figure, device 600 includes central processing unit (CPU) 601 that can execute various appropriate actions and processing according to a computer program instruction stored in read-only memory (ROM) 602 or a computer program instruction loaded into random access memory (RAM) 603 from storage unit 608. RAM 603 may also store various programs and data required for operations of device 600. CPU 601, ROM 602, and RAM 603 are connected to each other through bus 604. Input/output (I/O) interface 605 is also connected to bus 604.

A plurality of components of device 600 are connected to I/O interface 605, including input unit 606, for example, a keyboard or a mouse, output unit 607, for example, various types of displays or speakers, storage unit 608, for example, a disk or an optical disc, and communications unit 609, for example, a network adapter, a modem, or a wireless communications transceiver. Communications unit 609 allows device 600 to exchange information/data with another device through a computer network such as the Internet and/or various telecommunication networks.

The various processes and processing described above, for example, method 200, may be executed by processing unit 601. For example, in some embodiments, method 200 may be implemented as a computer software program that is tangibly contained in a machine-readable medium, for example, storage unit 608. In some embodiments, part or all of the computer program may be loaded and/or installed onto device 600 via ROM 602 and/or communications unit 609. When the computer program is loaded onto RAM 603 and executed by CPU 601, one or more actions of method 200 described above may be executed.

The present disclosure may be a method, an apparatus, a system, and/or a computer program product. The computer program product may include a computer-readable storage medium which carries a computer-readable program instruction for executing various aspects of the present disclosure.

The computer-readable storage medium may be a tangible device that is able to retain and store instructions for use by an instruction execution device. For example, the computer-readable storage medium may be, but is not limited to, an electric storage device, a magnetic storage device, an optical storage device, an electromagnetic storage device, a semiconductor storage device, or any appropriate combination thereof. More specific examples (a non-exhaustive list) of the computer-readable storage medium include a portable computer disk, a hard disk, a random access memory (RAM), a read-only memory (ROM), an erasable programmable read-only memory (EPROM or a flash memory), a static random access memory (SRAM), a compact disc read-only memory (CD-ROM), a digital versatile disk (DVD), a memory stick, a floppy disk, a mechanical coding device such as a punch card or a raised structure in a groove that stores an instruction, and any appropriate combination thereof. The computer-readable storage medium used herein is not to be construed as a transitory signal, such as a radio wave or other freely propagating electromagnetic waves, an electromagnetic wave propagating through a waveguide or other transmission media (for example, an optical pulse passing through an optical fiber cable), or an electrical signal transmitted through an electrical wire.

The computer-readable program instruction described herein may be downloaded to computing/processing devices from a computer-readable storage medium or to an external computer or external storage device via a network, for example, the Internet, a local area network, a wide area network, and/or a wireless network. The network may include copper transmission cables, optical fibers transmission, wireless transmission, routers, firewalls, switches, gateway computers, and/or edge servers. A network adapter or network interface in each computing/processing device receives a computer-readable program instruction from the network, and forwards the computer readable program instruction for storage in a computer-readable storage medium of the computing/processing device.

The computer program instruction for executing operations of the present disclosure may be an assembly instruction, an instruction-set-architecture (ISA) instruction, a machine instruction, a machine related instruction, microcode, a firmware instruction, state-setting data, or source code or object code written in any combination of one or more programming languages, including an object oriented programming language such as Smalltalk or C++, and a conventional procedural programming language such as the "C" programming language or a similar programming language. The computer readable program instruction may be executed entirely on a user computer, partly on a user computer, as a stand-alone software package, partly on a user computer and partly on a remote computer, or entirely on a remote computer or server. In a case involving a remote computer, the remote computer may be connected to a user computer through any type of network, including a local area network (LAN) or a wide area network (WAN), or may be connected to an external computer (for example, through the Internet using an Internet service provider). In some embodiments, an electronic circuitry, for example, a programmable logic circuitry, field-programmable gate array (FPGA), or programmable logic array (PLA), is customized by utilizing state information of the computer-readable program instruction. The electronic circuitry may execute a computer-readable program instruction to implement various aspects of the present disclosure.

Aspects of the present disclosure are described herein with reference to flowcharts and/or block diagrams of the method, apparatus (system), and computer program product according to the embodiments of the present disclosure. It should be understood that each block of the flowcharts and/or block diagrams, and a combination of blocks in the flowcharts and/or block diagrams may be implemented by computer-readable program instructions.

These computer-readable program instructions may be provided to a processing unit of a general purpose computer, special purpose computer, or other programmable data processing apparatuses to produce a machine, such that when being executed by the processing unit of the computer or other programmable data processing apparatuses, the instructions create an apparatus for implementing functions/actions specified by one or more blocks in the flowcharts and/or block diagrams. These computer-readable program instructions may alternatively be stored in a computer-readable storage medium, and direct a computer, a programmable data processing apparatus, and/or other devices to operate in a particular manner, such that the computer-readable medium having instructions stored therein includes an article of manufacture including instructions that implement aspects of the functions/actions specified in one or more blocks in the flowcharts and/or block diagrams.

The computer-readable program instructions may alternatively be loaded onto a computer, other programmable data processing apparatuses, or other devices to cause a series of operational steps to be executed on the computer, other programmable data processing apparatuses, or other devices to produce a computer implemented process, such that the instructions executed on the computer, other programmable apparatuses, or other devices implement the functions/actions specified in one or more blocks in the flowcharts and/or block diagrams.

The flowcharts and block diagrams in the accompanying drawings illustrate a system architecture, functionality, and operations of possible implementations of the system, method and computer program product according to various embodiments of the present disclosure. In this regard, each block in the flowcharts or block diagrams may represent a module, code segment, or part of instructions that includes one or more executable instructions for implementing a specified logic function. In some alternative implementations, functions noted in the blocks may occur in an order different from that noted in the figures. For example, two consecutive blocks may, in fact, be executed substantially concurrently, or may sometimes be executed in a reversed order, depending upon an involved functionality. It should also be noted that each block in the block diagrams and/or flowcharts and a combination of blocks in the block diagrams and/or flowcharts may be implemented by a special purpose hardware-based system that implements a specified function or action, or a combination of special purpose hardware and a computer instruction.

The descriptions of various embodiments of the present disclosure are presented for the purpose of illustration, but are not intended to be exhaustive or limited to the disclosed embodiments. Without departing from the scope and spirit of the described embodiments, many modifications and changes will be apparent to those of ordinary skill in the art. The terminology used herein is chosen to best explain the principles and practical applications of the embodiments, or the technical improvements to technologies in the market, or to enable others of ordinary skills in the art to understand the embodiments disclosed herein.

What is claimed is:

1. A task scheduling method, comprising:
in response to determining that a currently available resource of a task processing system cannot satisfy a resource requirement of a to-be-executed current task set of a plurality of task sets, scheduling, for execution, one or more tasks in the current task set that can be supported by the currently available resource, wherein tasks in each task set are independent of each other;
executing the one or more tasks in the current task set that can be supported by the one or more currently available resources in a first round of execution;
creating, based on one or more tasks that have not been scheduled in the current task set, a to-be-scheduled task set for a next round of scheduling;
determining, in a next task set of the plurality of task sets that follows the current task set, a subset of tasks comprising one or more tasks that are independent of the one or more tasks in the to-be-scheduled task set, wherein the next task set is dependent at least in part on the current task set;
moving the subset from the next task set into the to-be-scheduled task set; and
executing the one or more tasks of the to-be scheduled task set and the one or more tasks of the moved subset in the next task set in a second round of execution;
wherein moving the subset from the next task set into the to-be-scheduled task set comprises:
adding the subset to the to-be-scheduled task set; and
deleting the subset from the next task set.

2. The method according to claim 1, wherein each task set comprises parallel tasks of a neural network model.

3. The method according to claim 2, wherein the plurality of task sets are generated based on a computation graph, and the computation graph is generated by compiling the neural network model.

4. The method according to claim 3, wherein a resource required for executing the parallel tasks is obtained by virtually compiling the computation graph.

5. The method according to claim 1, further comprising:
determining, based on a resource required for executing tasks in the current task set, whether the currently available resource can satisfy the resource requirement of the current task set.

6. The method according to claim 1, further comprising:
determining the currently available resource based on at least one of a computing resource and a storage resource that are currently available to the task processing system.

7. The method according to claim 1, wherein the task processing system comprises a plurality of dedicated resources, wherein the one or more tasks in the to-be-scheduled task set and the one or more tasks of the moved subset in the next task set are executed by another available resource of the task processing system.

8. An electronic device, comprising:
at least one processing unit; and
at least one memory, wherein the at least one memory is coupled to the at least one processing unit and stores instructions to be executed by the at least one processing unit, and when the instructions are executed by the at least one processing unit, the device is caused to execute the following steps:
in response to determining that a currently available resource of a task processing system cannot satisfy a resource requirement of a to-be-executed current task set of a plurality of task sets, scheduling, for execution, one or more tasks in the current task set that can be supported by the currently available resource, wherein tasks in each task set are independent of each other;
executing the one or more tasks in the current task set that can be supported by the one or more currently available resources in a first round of execution;
creating, based on one or more tasks that have not been scheduled in the current task set, a to-be-scheduled task set for a next round of scheduling;
determining, in a next task set of the plurality of task sets that follows the current task set, a subset of tasks comprising one or more tasks that are independent of the one or more tasks in the to-be-scheduled task set, wherein the next task set is dependent at least in part on the current task set;
moving the subset from the next task set into the to-be-scheduled task set; and
executing the one or more tasks of the to-be scheduled task set and the one or more tasks of the moved subset in the next task set in a second round of execution;
wherein moving the subset from the next task set into the to-be-scheduled task set comprises:
adding the subset to the to-be-scheduled task set; and
deleting the subset from the next task set.

9. The electronic device according to claim 8, wherein each task set comprises parallel tasks of a neural network model.

10. The electronic device according to claim 9, wherein the plurality of task sets are generated based on a computation graph, and the computation graph is generated by compiling the neural network model.

11. The electronic device according to claim 10, wherein a resource required for executing the parallel tasks is obtained by virtually compiling the computation graph.

12. The electronic device according to claim 8, wherein the device is further caused to execute the following steps:
determining, based on a resource required for executing tasks in the current task set, whether the currently available resource can satisfy the resource requirement of the current task set.

13. The electronic device according to claim 8, wherein the device is further caused to execute the following steps:
determining the currently available resource based on at least one of a computing resource and a storage resource that are currently available to the task processing system.

14. The electronic device according to claim 8, wherein the device is further caused to execute the following step:
execute, with another available resource of a plurality of dedicated resources of the task processing system, the one or more tasks in the to-be scheduled task set and the one or more tasks of the moved subset in the next task set.

15. A computer program product which is tangibly stored on a non-volatile computer readable medium and comprises machine-executable instructions which, when executed, causing a device to:
in response to determining that a currently available resource of a task processing system cannot satisfy a resource requirement of a to-be-executed current task set of a plurality of task sets, scheduling, for execution, one or more tasks in the current task set that can be supported by the currently available resource, wherein tasks in each task set are independent of each other;
execute the one or more tasks in the current task set that can be supported by the one or more currently available resources in a first round of execution;
create, based on one or more tasks that have not been scheduled in the current task set, a to-be-scheduled task set for a next round of scheduling;
determine, in a next task set of the plurality of task sets that follows the current task set, a subset of tasks comprising one or more tasks that are independent of the one or more tasks in the to-be-scheduled task set, wherein the next task set is dependent at least in part on the current task set;
move the subset from the next task set into the to-be-scheduled task set; and
execute the one or more tasks of the to-be scheduled task set and the one or more tasks of the moved subset in the next task set in a second round of execution;
wherein moving the subset from the next task set into the to-be-scheduled task set comprises:
adding the subset to the to-be-scheduled task set; and
deleting the subset from the next task set.

16. The computer program product according to claim 15, wherein each task set comprises parallel tasks of a neural network model.

17. The computer program product according to claim 16, wherein the plurality of task sets are generated based on a computation graph, and the computation graph is generated by compiling the neural network model.

18. The computer program product according to claim 17, wherein a resource required for executing the parallel tasks is obtained by virtually compiling the computation graph.

19. The computer program product according to claim 15, wherein the device is further caused to execute the following step:
determining, based on a resource required for executing tasks in the current task set, whether the currently available resource can satisfy the resource requirement of the current task set.

20. The computer program product according to claim 15, wherein the device is further caused to execute the following step:
determining the currently available resource based on at least one of a computing resource and a storage resource that are currently available to the task processing system.

* * * * *